United States Patent [19]

Aoyama et al.

[11] Patent Number: 4,991,083
[45] Date of Patent: Feb. 5, 1991

[54] METHOD AND SYSTEM FOR EXTENDING ADDRESS SPACE FOR VECTOR PROCESSING

[75] Inventors: Tomoo Aoyama, Hadano; Shun Kawabe, Machida, both of Japan

[73] Assignees: Hitachi, Ltd.; Hitachi Computer Engineering Co., Ltd., both of Tokyo, Japan

[21] Appl. No.: 228,300

[22] Filed: Aug. 4, 1988

[30] Foreign Application Priority Data

Sep. 9, 1987 [JP] Japan ................................ 62-225896

[51] Int. Cl.⁵ ..................... G06F 15/347; G06F 12/02
[52] U.S. Cl. ................................... 364/200; 364/900; 364/232.21; 364/255.7; 364/931.51; 364/955.5
[58] Field of Search ... 364/200 MS File, 900 MS File, 364/736

[56] References Cited

U.S. PATENT DOCUMENTS

| | | |
|---|---|---|
| 4,630,230 | 12/1986 | Sundet . |
| 4,768,146 | 8/1988 | Nagashima et al. ................ 364/200 |
| 4,769,770 | 9/1988 | Miyadera ............................ 364/200 |
| 4,843,543 | 6/1989 | Isobe ................................... 364/200 |
| 4,888,679 | 12/1989 | Fossum et al. ..................... 364/200 |

Primary Examiner—Michael R. Fleming
Assistant Examiner—Gopal C. Ray
Attorney, Agent, or Firm—Fay, Sharpe, Beall, Fagan, Minnich & McKee

[57] ABSTRACT

A method and apparatus for extending an address space for a vector processor including a vector processing unit and a scalar processing unit. A main storage and an extended storage are also disclosed. An address translator is provided for each requestor within the vector processing unit. Each address translator includes registers for storing main storage addresses and extended storage addresses for the address translation, a register for storing information such as an invalid bit regarding an address space present on the main storage, a register for storing information such as a protection bit representative of an address translation enabled area, and registers for storing a reference bit and a write bit representative of the main storage reference status. The scalar processing unit includes an access controller for allowing a write/pad operation relative to the respective registers in the address translator. The vector processing unit includes a first logic circuit for temporarily suspending a main storage reference request sent from the requestor to an area not present on the main storage, a second logic circuit for releasing the suspension, and a third logic circuit for informing the scalar processing unit of the suspension of the main storage reference request.

16 Claims, 5 Drawing Sheets

F I G. 5
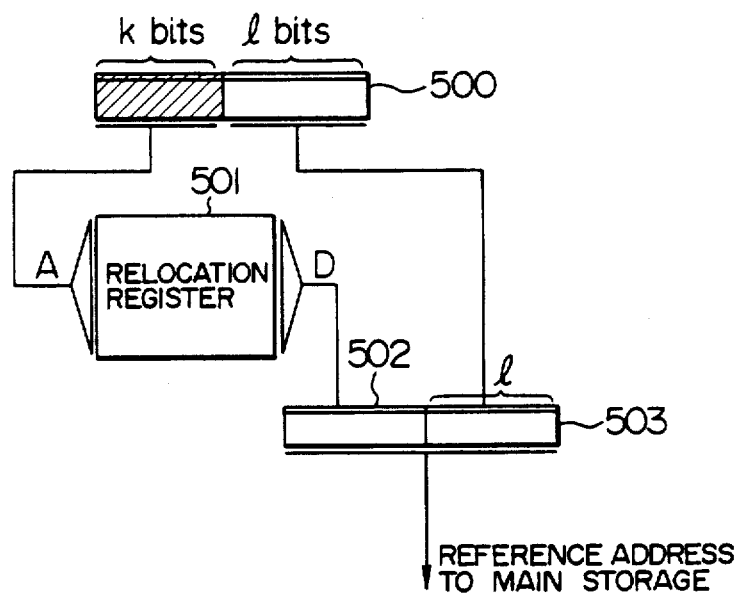
F I G. 6
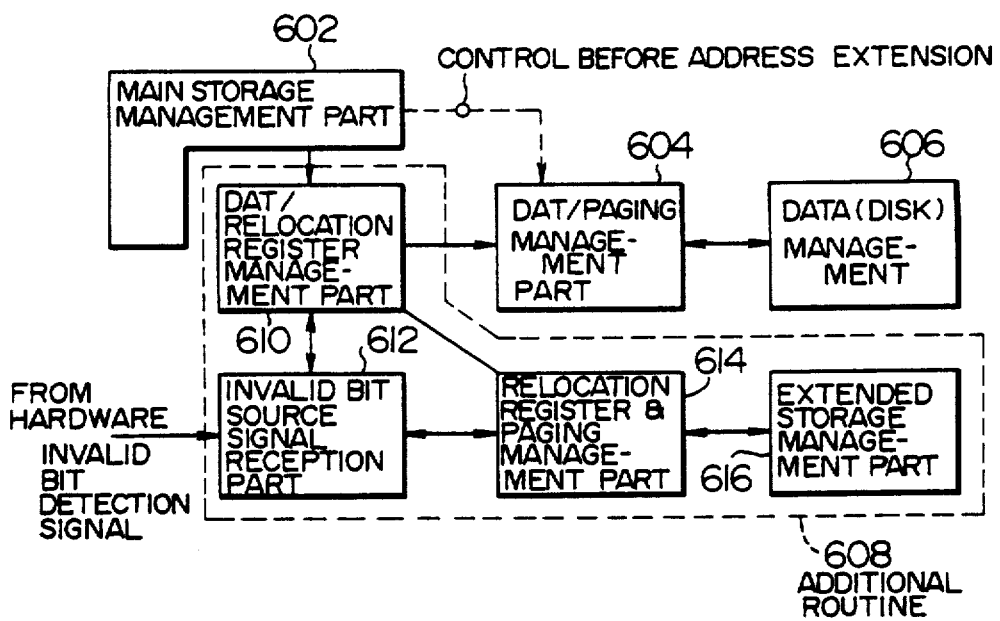

METHOD AND SYSTEM FOR EXTENDING ADDRESS SPACE FOR VECTOR PROCESSING

BACKGROUND OF THE INVENTION

The present invention relates to a vector processor and more particularly, to a vector processor suitable for extending an address space.

A vector processor is generally constructed of a scalar processing unit, a vector processing unit and a main storage accessible by both the processor units. The scalar processing unit executes instructions of the same type as those used by a general purpose computer, whereas the vector processing unit executes vector instructions to perform vector processing.

The application fields of vector processors will expand in the future. The performance of vector processors will need to be much improved and, at the same time, the expansion of address space will be needed. To realize high speed operation, the main storage of a vector processor is made up of high speed memory devices. Therefore, if a main memory of a large capacity is used to extend an address space, the cost of the vector increases In consideration of such high cost, an extended storage using low speed and high capacity memory devices as an external storage is disclosed, for example, in U.S. Pat. No. 4,630,230, issued Dec. 16, 1986.

An extended storage used as an external storage can provide a large address space at lower cost than that obtained by a main storage only. However, this arrangement poses some restrictions in that the extended storage uses lower speed memory devices than the main storage, and it must be located at a position farther from the CPU than the main storage. Therefore, the data transfer speed is lower. If the lower data transfer speed is intended to be recovered by changing the transfer data length, the consistency with the data processing unit of the CPU is lost. In view of this, in some case, the data processing at the CPU is separated in the time domain from the data transfer processing to and from the main storage and the extended storage. Thus the main storage is used as a local memory. With this method, however, user programs must support time separation of both the processings, and the data buffer processing. As a result, the logical structure of programs becomes complicated. Thus, the problem of difficult understanding of programs and a lack of versatility of programs ensues.

SUMMARY OF THE INVENTION

According to the present invention, the extension of logical address space of a vector processor is realized not by a newly added address space on an extended storage but by a paging process by the vector processor. It is therefore an object of the present invention to provide a method and a system for extending an address space of a vector processor without additionally providing an address space on the extended storage.

According to one aspect of the present invention, a vector processor is provided which comprises a vector processing unit, a scalar processing unit, a main storage and an extended storage. An address translator is provided for each requestor in the vector processing unit. The address translator comprises storage means for storing main storage addresses and extended storage addresses for the address translation, storage means for storing information regarding an address space present on the main storage, storage means for storing information representative of an address translation enabled area, and means for storing the main storage reference status. The scalar processing unit includes an access controller for allowing a read/write operation of the respective storage means within the address translator. The vector processor unit includes a logic circuit for temporarily suspending a main storage reference request sent from a requestor when an attempt is made to access an area not present on the main storage and releasing the suspension of the main storage reference request. Suspension is released when the operating system sends appropriate instructions to release suspension. The suspension is not unconditionally released. The vector processor also includes a logic circuit for informing the scalar processing unit of the suspended condition of the main storage reference request.

The characteristic feature of a vector processor is that a set of vector data to be processed must be present wholly on the main storage. This restriction makes it impossible to resume a vector process once it has been interrupted by another vector process.

Since the hardware of a vector processor is designed to maximize performance, the data processing pipeline pitch is set as fine as possible. As a result, it is difficult to stop the operation at an optional timing. Also, the scale of logics for such interruption becomes large. In view of this, the conventional vector processor uses hardware to allow an interruption of vector processing at the end of executing a single vector instruction or a series of vector instructions. Consequently, if data unlocated (not existing) in the main storage is requested during the execution of a vector instruction, there is no change to start a paging process which loads the data from the paging device into the main storage.

A vector processor issues a main storage reference request from a resource called a requestor. Generally, a plurality of requestors are provided in a vector processor. A plurality of requestors may sometime issue storage reference requests at the same address and at the same time. To avoid operation errors in such a case, the priority order of reference requests is determined by a main storage control unit. The requestor is provided with logic for issuing a reference request after the priority order determining process. Therefore, the requestors have a function to interrupt the process. This function is different from vector operation units (arithmetic and logic units) and the like.

A reference request to the main storage issued by the vector processor is performed using a real address. On the other hand, an address generated by a requestor of the vector processor is a logical address. In a conventional vector processor, a logical address is equal to a real address so that inconsistency between them does not occur. However, if a paging process is to be realized by a vector processor, the addresses are not consistent. To circumvent this problem an address translator is provided for each requestor. It is difficult to perform an address translation of a vector processor in such a manner as is done by a general purpose computer. The reason for this is that the amount of data references in a vector processor is greater than that in a general purpose computer by about ten times. Also, a vector is required to process reference requests as continuously as possible.

An address translation by the address translator of a vector processor is performed by a relocation process. With the relocation process, a translation table is referred to by using a part of an address. The referenced result is replaced with part of the address to obtain a translated address. Also in the relocation process, the translated result is always obtained after a constant delay time from the time of a translation request. Thus, the pitch of main storage reference requests in the vector processor is not lowered.

An example of the relocation process will be described with reference to FIG. 5. In FIG. 5, an address generated within a vector processor is set in a register 500 The upper k bits (hatched portion) of the register 500 are used as an address for the reference to a relocation register 501. The reference result is set in a register 502. The lower l bits of the register 500 are directly set in a register 503. The contents of the registers 502 and 503 are regarded as one address which is issued as a main storage reference address.

The area of the main storage indicated by (l+1) bits is called one unit (block). The size of one block is determined optionally based on the storage-device technology.

To avoid a reference to an unlocated main storage area, a translation table prepares all the units of the logical address space divided by a predetermined unit. The translation table contains an indication bit which turns on (i.e. "1") when an unlocated main storage area is referred to, as well as a translated address, This indication bit is called an invalid (I) bit hereinafter. Such arrangement is disclosed, e.g., in a Hitachi Model 820 Processing System Manual, "6020-2-001" at pp. 181 to 194 which constitutes a part of the disclosure of this invention and is incorporated herein by reference.

According to the present invention, if an invalid bit "1" is detected at a main storage reference request, the reference request is suspended within the address translator so as not to be sent to the priority order determining circuit of a main storage control unit. Such a control of not sending a reference request is indicated to all the requestors. The translation table is also provided with a reference bit and a write bit for each unit area of the main storage. The reference bit and the write bit are called hereinafter an R bit and a C bit, respectively. The translation table is also provided with a field for each logical address unit for storing an address of the extended storage or alternative code information, which indicates a location where the data in the logical address unit are present. The address of the extended storage may be a virtual address, a real address, or a prefix translated address for use with a multiprocessor. The translation table is further provided with a protection (P) bit for inhibiting a reference to a "specific area" of the main storage to be described later.

When a main storage reference request is issued from a requestor of the vector processor, an address for referring to the translation table is generated by using a part of a logical address. Using this address, the invalid bit in the translation table is referred to. If the invalid bit is "1", an interruption is informed to the scalar processing unit of the vector processor. Alternatively, if a reference request is issued to a located main storage area, the R bit in the unit area of the main storage corresponding to the reference request is set to "1". In case of a write process request for the main storage, the C bit is set to "1". The values of the R and C bits are used in the process of loading data of the extended storage into the main storage.

In addition to the above arrangement, the scalar processor unit is provided with a logic unit such as a decoder for allowing transmission of a reference request suspended within an address translator of the vector processing unit to the priority order determining circuit of the main storage control unit.

The address extension is closely related to software product, including an OS (operating system). The address extension with respect to a vector process will be discussed.

A user logical address space is under the management of the OS of a general purpose computer Therefore, if the bit length of an address register of the hardware is changed, the computer does not operate normally unless the address data length handled by the OS is also changed. Further, since the data length of various address constants at a sub-routine call is set so as to coincide with the data length handled by the OS, these constants must be changed. User programs of an object module type are also required to be re-compiled using source codes. As above, an address extension necessitates a change of a considerable amount of software products. This change is presently more difficult than that of hardware.

In order to extend the address space of a vector processor while making conventional software products compatible, it becomes necessary to adopt a limited arrangement wherein a logical address space capable of being referred to by a vector processing unit is extended, and the space for locating vector data is extended without extending the address space for the locating programs. The vector data herein used is defined as the data to be referred to by the vector processing unit of a vector processor. Since the vector data can be referred to only by the vector processing unit, it is not necessary for the paging process part of the OS to manage the vector data space.

According to the vector data management, upon reception of an interruption informed by the address translator of the vector processing unit, the processing at the scalar processing unit is interrupted to perform a process of generating a space capable of being referred to by the vector processing unit and, thereafter, the suspension of the main storage reference request by the address translator is released.

The vector data management as above can be realized as a kind of additional processing routine to the OS. Due to the adoption of such an additional routine system, a portion of software processing by the additional routine can be realized by hardware to speed up the process. In addition, a considerably large logical address space can be realized without a restriction of the address data length handled by the OS. For instance, it becomes possible to provide a user logical address space in excess of a 2 GB address space of 31 bits. By way of an example, an OS is constructed as shown in FIG. 6 wherein the main storage is divided into space 1 and space 2. The space 1 is arranged to be controlled by the main storage management part of the OS, and the space 2 can be assigned the main storage area in excess of 2 GB, where the space is managed by the additional routine. In FIG. 6, the OS comprises a main storage management part 602, a DAT/paging management part 604, a data (disk) management part 606, a DAT/relocation register management part 610, an invalid bit source signal reception part 612, a relocation/register and paging management part 614, and an extended storage management part 616. The additional routine unit including the management programs 610 to 616 starts operating in response to an invalid bit detection.

In the above-described arrangement, the scalar processor unit and the vector processing unit of the vector processor each have an independent address translator unit. The integrity guarantee between both the translator units must be conducted by the OS. In this case, a specific area of the logical address, e.g., the area to be processed by the paging process part of the OS, is sometimes arranged not to be assigned the vector data area. In such a case, a protection bit is used to stop the additional routine of the OS The "specific area" mentioned in the preceding description is such an area just described above. The address translation and paging operation of the vector processor of this invention under the above-described OS environment, will be described.

Using a logical address generated by a requestor of the vector processor, the address translation table is referred to at the divided block corresponding to the referred main storage. At this time, the protection bit, invalid bit and a translated address are referred to. The reference to the translation table is performed in the order of the protection bit, the invalid bit and the translated address. If the protection bit is "1", address translation is impossible so the vector processor unit issues an interruption to the scalar processing unit. Upon this interruption, the processing by the scalar processor unit is changed to the processing by an OS supervisor.

If the invalid bit is "1", the address translator suspends a main storage reference request sent from the requestor so that the operation of the requestor is interrupted. When the main storage reference request by a requestor is suspended in the vector processing unit having a plurality of requestors to conduct a parallel operation thereof, the operation of the other requestors is also interrupted irrespective of each value of the invalid bit. The interruption of the operation of the requestor does not influence the operation of the vector operation units. As a result, the vector process continues to be performed using the data on the vector registers as sources and sinks. If an invalid bit "1" is not detected by the address translator, the main storage reference request sent from the requestor is subjected to the address translation and sent to the priority order determining circuit of the main storage control unit. At this time, the R bit of the address translation table is set to "1". In the case where the main storage reference request is a write request, the C bit is set to "1". When an invalid bit "1" is detected by the address translator of the vector processor, an interruption signal is sent to the scalar processing unit. This interruption may be handled in various manners. In the description of the present invention, an external interruption process is assumed.

An interruption generated by the vector processor unit is suspended until the OS accepts the interruption. Namely, the interruption is suspended until the interruption mask of the scalar processing unit becomes "1". When the interruption mask becomes "1", the count of an instruction counter of the scalar processing unit is changed and the control is transferred to the interruption processing routine. Such a transfer is applicable only to the scalar processing unit and not to the vector processing unit. Therefore, during the interruption processing routine, the vector operation units of the vector processing unit continues to perform a vector process. The following processes are performed at the interruption processing routine.

1. Invalid bits, R and C bits at the address translation table at addresses corresponding to a reference address to the relocation table to which an interruption was issued are read out to identify the main storage block areas not invalid. In other words, invalid bits, R and C bits which are located on the address translation table except the currently referenced address are read out to identify the main storage block areas not invalid. The identification criterion is conducted in the order of (1) R=C=0 bit areas, (2) if there is no R bit of "0", then C=0 bit areas, and (3) if there is not R bit and C bit of "0", then areas not invalid are identified using random numbers. The areas not invalid on the main storage identified as above are called a replace area. The identification process is performed using a combination of a series of instructions during the interruption processing routine executed by the scalar processor unit of the vector processor. To speed up the identification processing, the R bit may be considered always "1". In this case, the hardware for reading and checking the R bit can be omitted.

2. Next, if the C bit is "1", the replace area of the main storage is transferred to the extended storage, by referring to the address of the extended storage corresponding to the replace area stored in the translation table. If a code is set in place of such an address, this code is referenced to generate the address of the extended storage. Data transfer of the main storage area to the extended storage is performed by executing a data transfer instruction within the interruption processing routine. If the C bit is "0", the above processes can be omitted. The invalid bits of the translation table at the replace area are set to "1".

3. Data are transferred from the extended storage to the areas of the main storage to which the main storage reference request was issued. This process is also performed by issuing a data transfer instruction during the interruption processing routine. After the data transfer, the invalid bit in the translation table is reset to "0". The R and C bits are set to "1" and "0", respectively. The reason for not resetting the R bit, to "0" is that sometimes, after the re-start of the vector process a main storage reference request indicates the area not present on the main storage. It is intended to lessen the possibility of such an area to become the replace area.

4. Next, the real address on the main storage with the main storage reference request being suspended is set in the address translation table. This operation may be performed simultaneously with resetting of the R and C bits in the above process (3).

5. A release instruction to release the main storage reference request suspension is issued to the address translator of the vector processing unit.

After the above interruption processing routine, the release operation of the main storage reference request is performed at the address translator of the vector processing unit. At this time, the reference request suspended refers again to the translation table. The address translation and the paging by the vector processing are achieved by the above processes.

BRIEF DESCRIPTION OF THE DRAWINGS

FIG. 5 is a schematic diagram used for explaining the relocation process according to the present invention by way of example; and FIG. 6 is a block diagram showing an example of the structure of an additional routine for realizing the extension of address space according to the present invention.

DESCRIPTION OF THE PREFERRED EMBODIMENTS

The embodiment of this invention will be described with reference to the accompanying drawings.

Figure 1:
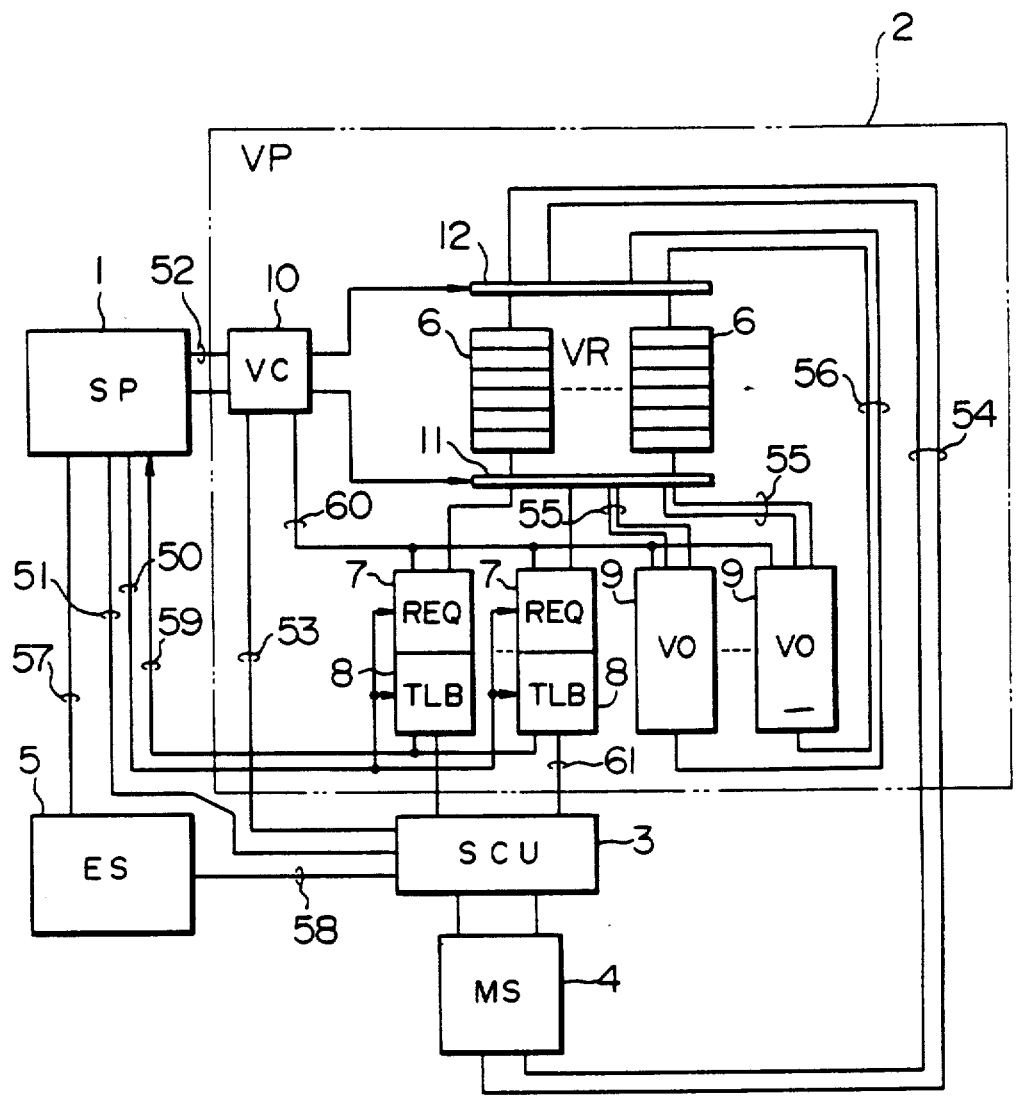
FIG. 1 is a block diagram showing the overall structure of an embodiment of a vector processor according to the present invention.

FIG. 1 shows the overall structure of an embodiment of a vector processor according to the present invention. The vector processor includes a scalar processing unit 1, a vector processing unit 2, a main storage control unit 3, a main storage 4 and an extended storage 5. The vector processing unit 2 includes vector registers 6, requestors 7, address translators (Translation Lookaside Table) 8, vector operation units (arithmetic and logic units) 9 and a vector instruction execution controller 10.

When the vector processor starts operating, initial values are stored in the requestors 7 and in storage means within the address translators 8 via a path 50. Next, the scalar processing unit 1 reads an instruction within the main storage 4 via a path 51 under control of the main storage control unit 3 and starts processing the instruction. If an instruction to start the vector processing unit 2 is present, this start instruction causes a start instruction signal to be outputted on a path 52.

Upon reception of the start instruction signal, the vector instruction execution controller 10 of the vector processing unit 2 reads a vector instruction within the main storage 4 via a path 53 under control of the main storage control unit 3 and decodes it to start the requestors 7, address translators 8 and vector operation units 9 within the vector processing unit 2. The start process is effected via a path 60. To make paths between these resources and the vector registers 6, switching circuits 11 and 12 are activated. The logical addresses of reference requests to vector data in the main storage 4 are generated by the requestors 7 and translated into real addresses by the address translators 8 to be sent to the main storage control unit 3. The main storage control unit 3 determines the order of main storage reference requests and sends it to the main storage 4. In case of a vector data load instruction, data read out of the main storage 4 is written in the vector register 6 designated by the instruction via a path 54 and the switching circuit 12. In case of a vector operation instruction, data to be operated upon are read out of the vector register 6 via the switching circuit 11 and a path 55. The processed result is sent to the vector register 6 where the result is to be written. The operation of a vector process is terminated upon issuance of a vector operation completion instruction.

The scalar processing unit 1 issues an instruction to operate the extended storage 5 via a path 57. Upon this instruction, the extended storage 5 reads data from and writes data into the main storage 4 via a path 58 under control of the main storage control unit 3.

If an address translation exception is detected by the address translator 8, an interruption is sent to the scalar processing unit 1 via a path 59. Release of the main storage reference request suspension condition of the address translators 8 is effected via the path 50.

Figure 2:
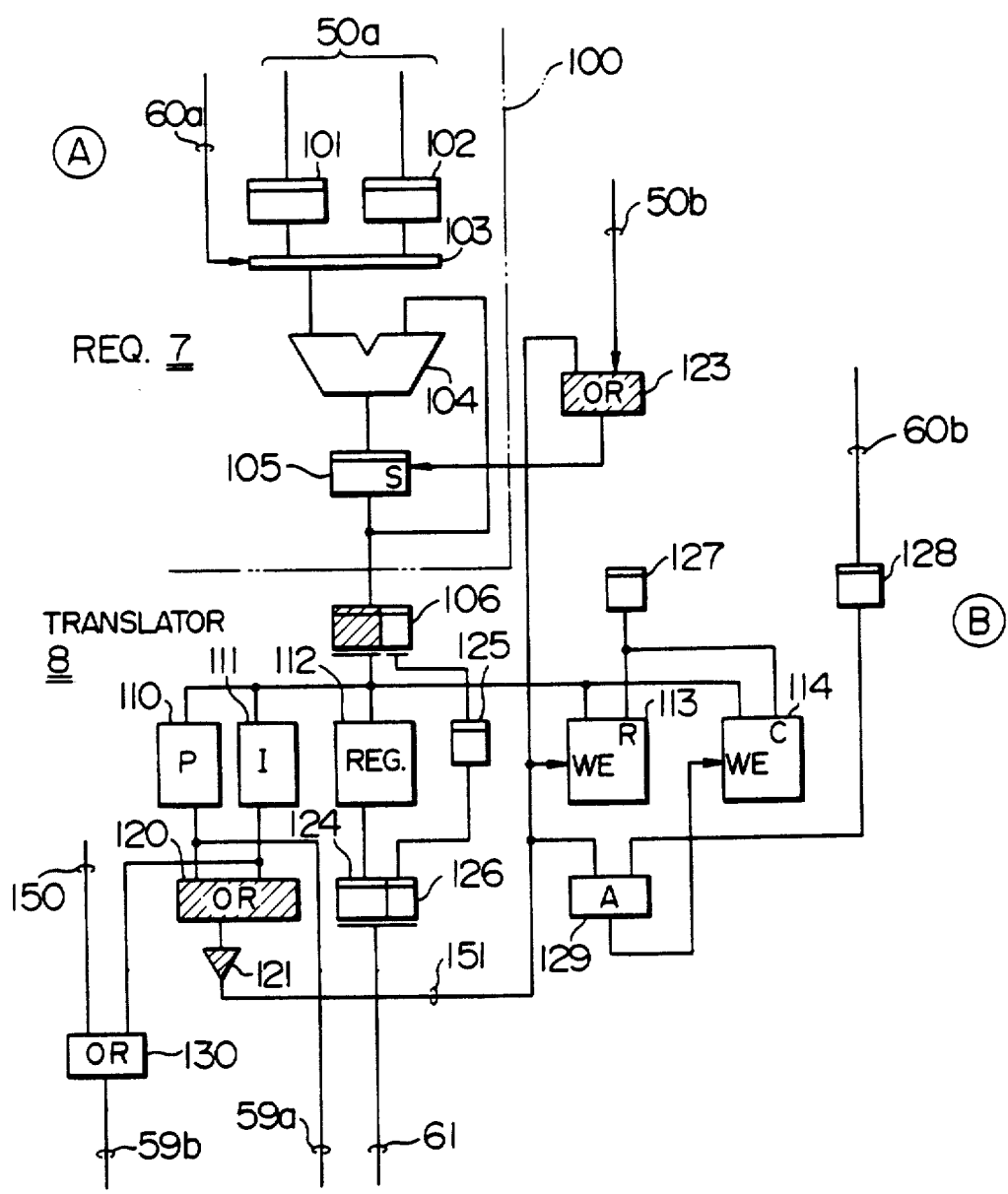
FIG. 2 is a detailed block diagram showing the address translator shown in FIG. 1.

FIG. 2 is a detailed block diagram of the requestor 7 and the address translator 8 shown in FIG. 1. In FIG. 2, the circuit portion on side A relative to a broken line 100 represents the requestor 7, and the circuit portion on side B represents the address translator 8. Like paths to those in FIG. 1 in the logical sense are represented by identical reference numerals. In FIG. 2, data read logics from the scalar processing unit 1 are omitted.

Registers 101 and 102 hold the base address and incremental address of vector data. The 0-th element of a vector data on the main storage is indicated by the base address, and the n-th element is indicated by a difference value between the 0-th and n-th element addresses. The difference value is obtained as the product of the incremental address and the element number. When the requestor 7 is started by the vector instruction execution controller 10, the base address in the register 101 is stored in a register 105 via a selector 103 and an adder 104. At the next timing, the incremental address in the register 102 is sent to the adder 104 to be added with the base address from the register 105 to thus generate the address of the next vector element.

A logical address is loaded in the register 105 of the requestor 7. A logical address from the register 105 is loaded in a register 106 of the address translator 8. The upper m bits of the address in the register 106 are subjected to an address relocation process. In FIG. 2, the upper m bits are shown as a hatched portion. The upper m bits of the address in the register 106 are sent to memory storage means 110 for storing protection bits, storage means 111 for storing invalid bits, storage means 112 for storing upper addresses after the translation, storage means 113 for storing R bits, and storage means 114 for storing C bits.

A protection bit corresponding to a memory area to which a main storage reference request pertains is read from storage means 110. This information is sent to the scalar processing unit 1 via a path 59a and allows a transfer of the process to an interruption process routine. A protection bit read out of storage means 110 and an invalid bit read out of storage means 111 are subjected to a logical OR operation by an OR gate 120, the result being inverted by an inverter 121 and sent onto a path 151. A signal on the path 151 is hereinafter called a valid signal. A value "1" of the valid signal means that data associated with a main storage reference request are present on the main storage 4. If a value of the signal on the path 151 is "0", this signal makes the set signal of the register 105 become "0" via an OR gate 123. In this case, the address of the next element generated at the adder 104 is not set in the register 105 so that the address of the current vector element is maintained within the register 105.

Paths 50a and 50b correspond to the path 50 shown in FIG. 1. Effective signals are not sent to both paths at the same time. The base address and incremental address of vector data is sent onto the path 50a from the scalar processing unit 1 of the vector processor. An instruction to release a main storage reference request suspension condition is sent onto the path 50b from the scalar processing unit 1.

Storage means 112 is referenced by using the upper m bits in the register 106 to obtain the upper m bits of a translated address which is loaded in a register 124. The lower bits in register 106 are loaded via a register 125 into the register 126. The address data in the registers 124 and 126 indicate a real address after the translation. The real address is sent to the main storage control unit 3 shown in FIG. 1.

A constant "1" is stored in a register 127. At the time when an actual address in the registers 124 and 126 is outputted to the main storage control unit 3, the signal value on the path is "1". The signal on the path 151 is sent to storage means 113 and 114 for storing the R and C bits so as to become a write instruction signal thereof. When a logical address is set in the register 106, the R bit corresponding to the main storage area represented by the address is set at "1".

An order is sent onto a path 60b from the vector instruction execution controller 10, the order indicating whether a vector instruction to be executed is a store process. In case of the store instruction, the value of the signal on the path 60b is made "1" in this embodiment. The order is loaded in a register 128 and subjected to a logical AND operation with a signal on the path 151. The result of the logical AND operation becomes a write enable instruction signal for storage means 114 for storing the C bit.

If an invalid bit referred to by using a logical address in the register 106 indicates that the logical address is not located in the main storage 4, the invalid bit is subjected to a logical OR operation with other invalid bit outputs on a path 150 from the other address translators operating in parallel with the address translator now concerned. The result is sent onto a path 59b and to the scalar processing unit 1.

Figure 3:
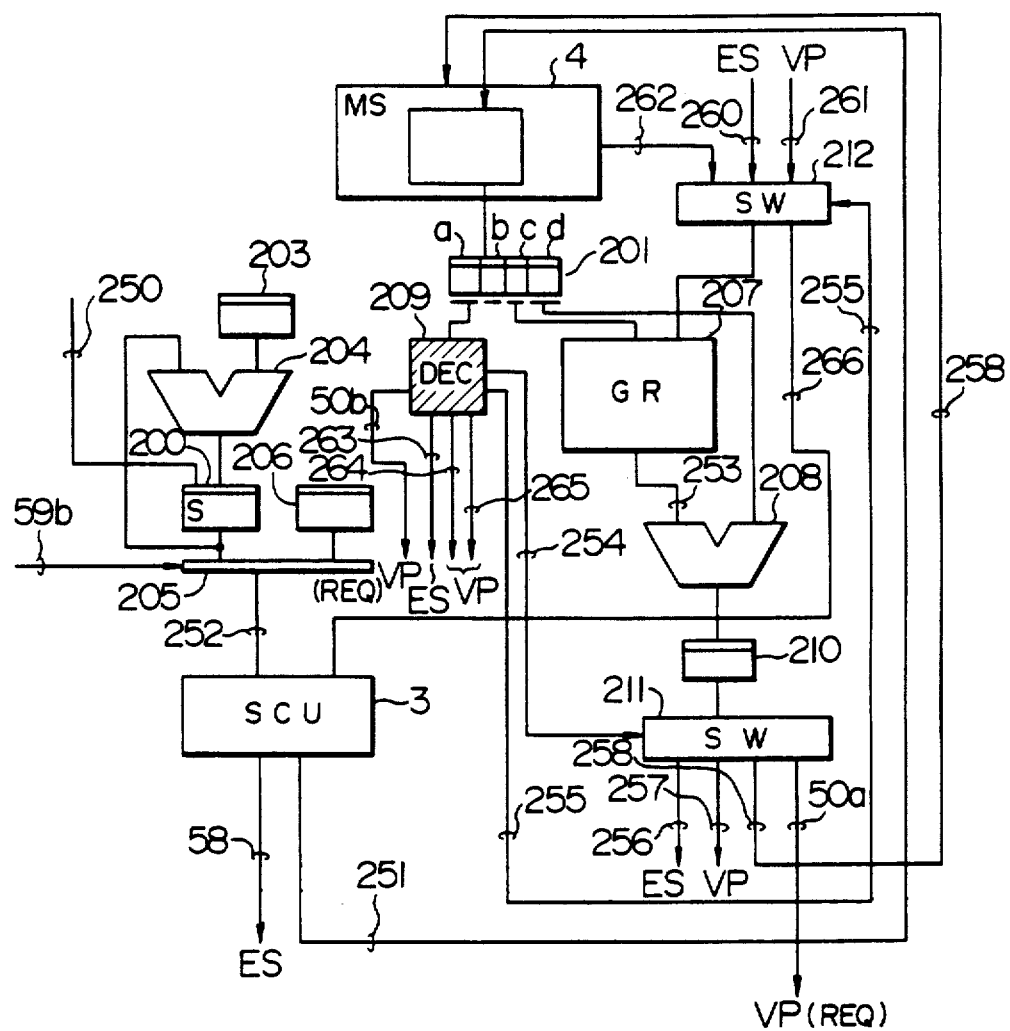
FIG. 3 is a detailed block diagram showing an instruction processing unit of the scalar processing unit shown in FIG. 1.

FIG. 3 is a detailed block diagram of an instruction processing unit of the scalar processing unit 1 shown in FIG. 1. For the purpose of simplifying the drawing, address translators in the scalar processing unit 1 are omitted since they are not directly related to the description of this invention.

The scalar processing unit 1 reads an instruction in the main storage at an address indicated by a program counter 200 and loads it in an instruction register 201. The instruction is decoded by a decoder 209 for data processing. An instruction word length is loaded in a register 203. The value of the program counter 200 and the instruction word length in the register 203 are added together by an adder 204. The addition result is set in the program counter when an instruction execution end is informed from resources in the scalar processing unit via a path 250. The address at the program counter 200 is sent via a selector 205, main storage control unit 3 and path 251 to the main storage 4.

If the address translator 8 of the vector processing unit 2 indicates no area of the main storage 4 corresponding to a main storage reference request, it is detected that the invalid bit is "1". The detection of "1" is sent via the path 59b to the selector 205. The address of an interruption process routine for a paging process to be executed by the vector processing unit 2 is loaded in a register 206. When the value of a signal on the path 59b becomes "1", the selector 205 connects an output from the register 206 to a path 252. As a result, 1. process by the scalar processing unit 1 changes from the scalar process of a user code and is loaded in the field 201a, 2. a register number the instruction processing result is stored and is loaded in the field 201b, 3. a base register number for use in generating an address necessary for loading data required for the instruction processing is loaded in the field 201c, and 4. a displacement value for use in generating the address is loaded in the field 201d. A group of registers appointed by these fields is collectively shown in FIG. 3 as a general register group 207.

The value in the register indicated by the field 201c of the register 201 is input to an adder 208 via a path 253 to be added to a displacement value in the field 201d, the addition result being set in a register 210. An operation code in the field 201a is decoded by the decoder 209 to determine to which unit of the vector processor an operand address in the register 210 is to be sent. This information is sent onto a path 254. Also, a code is generated which determines to which resource or unit of the vector processor the data obtained by the instruction processing is to be sent. The code is sent onto a path 255.

The information on the path 254 causes a switching circuit program to access a paging process for the vector processing unit 2. The following description is given assuming that a paging process instruction has been set in the register 201 in accordance with the address in the register 206. It is also assumed that the paging process instruction is constructed of four operands. However, this is a presumption for the purpose of giving the description more particularly and it is to be noted that the following processing is not necessarily required.

Information necessary for performing the paging process for the vector processing unit 2 is as follows:

1. The values of R and C bits in the address translators.
2. The address at the extended storage where the contents of a memory area not located in the main storage are stored.
3. Address data loaded in the registers other than the relocation register which was referred to by a main storage reference request.

An instruction loaded in the register 201 is assumed to be constructed of four fields, 201a to 201d. Namely, an operation 211 is to operate in such a manner that the operand address in the register 210 is sent to the extended storage 5, address translator 8 of the vector processor unit 2, and main storage 4, respectively via paths 256, 257 and 258.

The code on the path 255 causes a switching circuit 212 to determine a path connection when the instruction processing result is sent from the extended storage 5, address translator 8 and main storage 4. Data from the extended storage 5 and the address translator are sent via paths 260 and 261, respectively.

If an instruction in the register 201 is an instruction to read the R and C bits in the address translator 8 of the vector processing unit 2 and the main storage address and extended storage address in the address translation tables, the operand address in the register 210 is sent onto the path 257 via the switching circuit 211. At this time, a process code is sent via a path 264 to the address translator 8.

If an instruction in the register 201 is an instruction to change the contents of storage means 110 to 114 of the address translator 8, a value set in a certain register of the general register group 207 passes the adder 208 as it is and set in the register 210. Thereafter, it is sent onto the path 257 via the switching circuit 211. At this time, a process code is sent from the decoder 209 to the address translator 8 via a path 265.

If an instruction in the register 201 is an instruction to read the main storage 4 and load the readout data into one register or into a plurality of registers, the operand address in the register 210 is sent via the switching circuit 211 onto the path 258 and to the main storage 4.

The data read out of the main storage 4 is sent onto the path 262 and via the switching circuit 212 to the general register group 207.

If an instruction in the register 201 is an instruction to read the main storage 4 and store the readout data into the extended storage 5, the instruction processing has two stages. At the first stage, the operand address in the register 210 is sent via the path 256 to the extended storage 5. The code is sent via the path 263 which gives the base address to be used in storing data in the extended storage 5. Addressing to the extended storage 5 uses continuous addressing to speed up the data transfer rate. At the second stage, the base address for referring to the main storage 4 is set in the register 210 and sent via the path 258 to the main storage 4. The data read out of the main storage 4 is sent to the extended storage 5 via the path 262, the main storage control unit 3 and the path 58.

If an instruction in the register 201 is an instruction to read the extended storage 5 and store the read-out data in the main storage 4, the instruction processing also uses two stages. At the first stage, the operand address in the register 210 is sent to the extended storage 5 and is used as the base address for reading the extended storage. The code is sent via the path 263. At the next stage, the data read out of the extended storage 5 are input via the switching circuit 212 and the path 266 to the main control unit 3, and stored in the main storage 4 via the path 251.

If an instruction in the register 201 is an instruction to set the base and incremental values of the address within the requestor 7 of the vector processing unit 2, the data in the general register group 207 passes the adder 208 and is sent onto the path 50a via the register 210 and the switching circuit 211. If an instruction in the register 201 is an instruction to release the main storage reference request suspension condition at the address translator 8 of the vector processing unit 2, a release instruction is sent to the requestor 7 from the decoder 209 via the path 50b.

The combination of the above six instructions realizes an interruption routine by which the paging process for the vector processing unit 2 is performed by the scalar processing unit 1. If data to be written in the address translator 8 are of a one bit length such as the R or C bit, a part of the code information on the path 265 is used as such the data. If data to be written in the address translator 8 is several bytes in length, such as the address of the main storage or the extended storage, the path 257 is used time divisionally for the address and the data.

Figure 4:
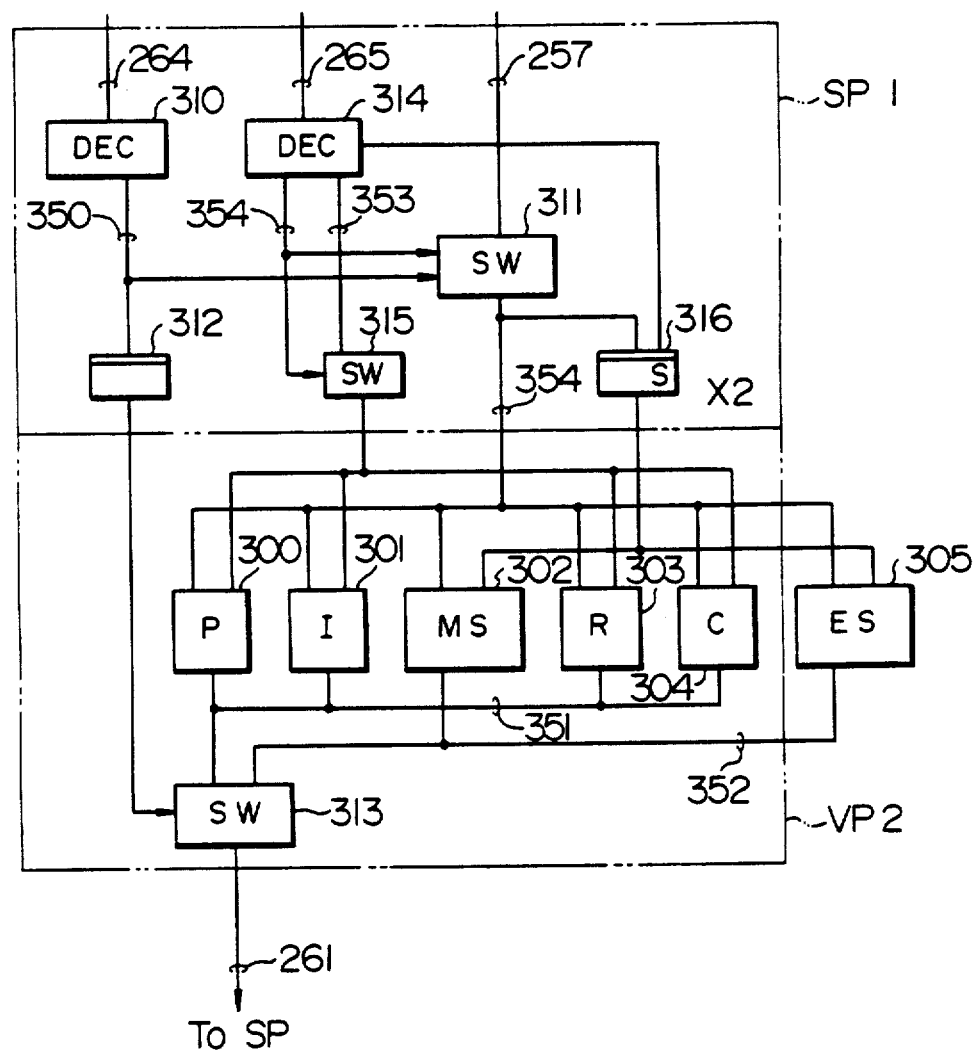
FIG. 4 is a detailed block diagram showing a reference request control unit to storage means in the address translator shown in FIG. 1.

FIG. 4 is a block diagram showing the logic unit for a reference process by the scalar processing unit 1 to storage means in the address translator 8 of the vector processing unit 2. The storage means within the address translators 8 include a unit 300 for storing protection bits, a unit 301 storing invalid bits, a unit 302 for storing main storage addresses, a unit 303 for storing R bits, a unit 304 for storing C bits, a unit 305 for storing extended storage addresses. The addresses of storage means 300 to 305 are related to each other in one-to-one correspondence. Storage means 300 to 304 correspond to the storage means 110 to 114 shown in FIG. 2. For the purpose of simplifying FIG. 4, output signal paths of switching circuits are collectively shown as a single bundled path.

Referring to FIG. 4, it is assumed that an order to request a read of storage means has been sent to a path 264, and the address of storage means has been sent to a path 257. The order signal on the path 264 is decoded by a decoder 310 to determine the destination of the address. This information is sent via a path 350 to a switching circuit 311 to activate it. The address on the path 257 is sent to each storage means 300 to 305 by the switching circuit 311. The decoded information on the path 350 is loaded in a register 312 and thereafter, it is sent to a switching circuit 313 to activate it. Data read out of each storage means 300 to 305 are sent to a switching circuit 313 via paths 351 and 352. The path 351, shown as a single bundled path, transfers data of one bit length, whereas the path 352, also shown as a single bundled path, transfers data of several byte lengths. The switching circuit 312 selects the data signals of the storage means based on the decoded information in the register 312 and sends them onto a path 261.

When a write request of a protection bit, invalid bit, R bit and C bit is sent onto a path 265, the request is decoded by a decoder 314. The data portion on the path 265 is output to a path 353, and the destination information of the data is output to a path 354. The data on the path 353 is sent to storage means 300 to 304 via a switching circuit 315. The address on the path 257 is sent via the switching circuit 311 to each storage means 300 to 305.

If a write request on the path 265 is for the main storage address or the extended storage address, the write request pitch becomes twice that of the one bit write request. The reason for this is that the path is commonly used for both data and address to reduce the number of paths, which does not concern the essential feature of this invention. The write-in data on the path 257 are loaded in a register 316 via the switching circuit 311. A set signal for the register 316 is sent when the decoder 314 detects a write request, and it becomes "0" at the next timing. The address information on the path 257 is sent onto the path 354 and to each storage means via the switching circuit 311.

According to the present invention, the extension of address space of the vector processing unit can be realized by changing the interruption processing routine or adding a sub-routine thereto without changing the main part of the OS regarding the paging. Thus, it is possible to extend the data space for the vector processing in excess of the upper addressing limit to which the OS always pays attention.

A current vector processor can use an extended storage which is required to be used as an external storage, as a part of the main storage, in accordance with the present invention. As a result, coding of a user program can be performed as if a very large data space is present, so that it becomes easy to understand the logical structure of programs and improve the portability of programs.

We claim:

1. A method of extending a logical address space of a vector processor including a main storage, an extended storage, a scalar processing unit, and a vector processing unit which includes a vector instruction execution controller, vector registers, vector operators, requestors, and at least one address translator having an address translation table for each requestor, said method comprising the steps of:

(a) suspending a main storage reference request from said requestor through use of logic circuitry comprising the address translator and stopping the operation of said requestor through use of the translator if a reference result to said address translation table at the location corresponding to a block of said main storage to be referred to based on a logical address generated by said requestor is an indication of an address area not located on said main storage;

(b) issuing an external interruption processing request from said vector processing unit to said scalar processing unit through use of the translator in response to said unlocated address area indication at step (a);

(c) executing an external interruption processing by said scalar processing unit in response to said interruption processing request to transfer data from said extending storage into a memory area of said main storage at the location corresponding to said main storage reference request, and changing said unlocated address area indication by said address translation table into a located address area indication; and (d) setting by said scalar processing unit of an actual address of said main storage with respect to said reference request in said address translation table which has been suspended, and issuing by said scalar processing unit of an instruction to release the suspension of said main storage reference request to said address translator to thus execute the release operation.

2. The method as set forth in claim 1, wherein said release operation which releases the suspension of said main storage reference request, a release instruction is issued by said scalar processing unit to said requestor to allow the reference to said address translation table by said main storage reference request.

3. The method as set forth in claim 1, wherein a plurality of said address translation tables is provided for an each block of a logical space divided into predetermined units, each address translation table including a first field for storing addresses of said main storage and said extended storage for use with the address translation, and a second field for storing the information regarding the address space on said main storage whereby the information of the address translation table makes it possible to store all vector data on extended storage.

4. A method as set forth in claim 3, wherein said address translation table further includes a third field for storing information representative of an address translation enabled area and a fourth field for storing information representative of the main storage reference status, and whereby said scalar processing unit can control read/write access to said respective fields.

5. A method as set forth in claim 4, wherein said address translation table further includes a fifth field for storing an address of said extended storage or alternative code information, which is representative of a location where data corresponding to a block of a logical address are stored.

6. A method as set forth in claim 4, wherein when said address translation table is referred to at a location corresponding to a block of said main storage to be referred to, by using a logical address generated by said requestor, said third, second and first fields are referred to in this order.

7. A method as set forth in claim 1, wherein said vector processing unit and said scalar processing unit each have an independent address translator, and an operating system performs an integrity guarantee process for said independent address translators of both the units.

8. A method of extending an address space of a data processing apparatus including an address translator and a plurality of logic circuits for indicating a logical address space which is not present on a main storage, comprising the steps of:

(a) managing an area of said main storage by swapping said main storage area with an external storage by using one of said plurality of logic circuits;

(b) providing an indication bit at the others of said plurality of logic circuits, said indication bit being representative of an area of said main storage which cannot be managed at step (a) and being arranged to be set and reset;

(c) controlling a function executed by an operating system in response to trapping of output signals from said plurality of logic circuits;

(d) swapping an external storage other than said main storage with one of two logical address space areas of said main storage provided by step (b), which is not managed by step (a); and (e) providing an interruption processing routine for support at least one of steps (b), (c) and (d) to said operating system.

9. A vector processor comprising a main storage, an extended storage, a scalar processing unit, and a vector processing unit having vector registers, vector operation units and requestors operatively connected; wherein said vector processing unit includes at least one address translator, said address translator comprising storage means for storing main storage addresses and extended storage addresses for the address translation, storage means for storing information regarding an address space present on said main storage, storage means for storing information representative of an address translation enabled area, and means for storing the status of said main storage reference;

said scalar processing unit includes an access controller for allowing a read/write operation of said respective storage means of said address translator; and said vector processing unit comprises a first logic circuit for temporarily suspending a main storage reference request generated by said requestor when an area not present on said main storage was referred to, and suspending a write operation into reference status storage means for storing the reference status to said main storage, a second logic circuit for releasing the suspension of said main storage reference request, and a third logic circuit for informing said scalar processing unit of the suspended condition of said main storage reference request.

10. A vector processor as set forth in claim 9, wherein a first path and a second path are provided between said scalar processing unit and said vector processing unit, initial predetermined values of said requestors and said respective storage means in said address translator are sent via said first path, a signal for releasing the suspension of said main storage reference request at said address translator is sent via said first path, and an interruption is informed to said scalar processing unit via said second path when an address translation exception is detected by said address translator.

11. A vector processor as set forth in claim 10, wherein said storage means for storing information representative of said address translation enabled area comprises a first register for storing a protection bit, storage means for storing said main storage reference status comprises a second register for storing a reference bit for each of said block unit of said main storage and a third register for storing a write bit for each of said block unit, and said storage means for storing said address space information comprises a fourth register for storing an invalid bit.

12. A vector processor as set forth in claim 11, wherein when a protection bit corresponding to a memory area for a main storage reference request is read from said first register, said protection bit is sent via said second path to allow said scalar processing unit to perform an interruption routine.

13. A method of extending a logical address space of a vector processor including a main storage, an extended storage, a scalar processing unit, and a vector processing unit which includes a vector instruction execution controller, vector registers, vector operators, requestors, and at least one address translator having an address translation table for each requestor, the method comprising the steps of:

processing instructions in the scalar processing unit, the instructions being read from the main storage;

starting operation of the vector processing unit upon reception of a start instruction signal in the vector instruction execution controller, the start instruction signal being generated by the scalar processing unit in response to the instructions read from the main storage;

accessing address areas on the main storage during vector processing by generating logical addresses of main storage reference requests in the requestors and translating the logical address into real addresses in the address translator;

suspending the main storage reference requests when the real address generated to access the main storage is not located on the main storage;

generating a signal in the vector processor which indicates that the real address generated to access the main storage is not located on the main storage, the signal being sent to the scalar processing unit;

engaging an interruption processing routine in the scalar processing unit in response to the signal generated int he vector processor which indicates that the real address generated to access the main storage is not located on the main storage, wherein the interruption processing routine allows contents of the real address not located on the main storage to be accessed by the vector processing unit on the extended storage;

setting the real address in the address translator by the scalar processing unit; and, releasing the suspension of the main storage reference request by the scalar processing unit.

14. The method of claim 13 further comprising the step of inhibiting access to a specific area of the main storage of providing a protection bit for the specific area whereby the scalar processor is interrupted and an operating system supervisor begins processing when the protection bit is at a preselected level.

15. The method of claim 13 wherein the interruption processing routine is a paging process.

16. The method of claim 13 wherein the vector processing unit continues to perform vector processing during operation of the interruption processing routine.

* * * * *